(12) United States Patent
Kamimura et al.

(10) Patent No.: US 6,727,007 B2
(45) Date of Patent: Apr. 27, 2004

(54) MAGNETO-OPTICAL RECORDING MEDIUM WITH REFLECTIVE LAYER FORMED FROM TWO THIN FILMS POSSESSING DIFFERENT SURFACE TENSIONS

(75) Inventors: Takuya Kamimura, Kawasaki (JP); Tsutomu Tanaka, Kawasaki (JP); Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/107,587

(22) Filed: Mar. 27, 2002

(65) Prior Publication Data
US 2003/0113504 A1 Jun. 19, 2003

(30) Foreign Application Priority Data
Dec. 17, 2001 (JP) .......................... 2001-383178

(51) Int. Cl.⁷ .............................. C11B 11/105
(52) U.S. Cl. ................. 428/655; 428/661; 428/664; 428/672; 428/673; 428/686; 428/687; 428/141; 428/212; 428/409; 428/694 ML; 428/694 RL; 369/13.35; 369/13.4
(58) Field of Search ................ 428/611, 655, 428/661, 664, 672, 673, 686, 687, 141, 212, 409, 694 ML, 694 RL, 699; 369/13.35, 13.4

(56) References Cited

U.S. PATENT DOCUMENTS

| | | | | |
|---|---|---|---|---|
| 6,177,175 B1 | * | 1/2001 | Hashimoto | 428/141 |
| 6,538,960 B1 | * | 3/2003 | Sabi et al. | 369/13.38 |
| 2002/0025443 A1 | * | 2/2002 | Ohno | 428/469 |

FOREIGN PATENT DOCUMENTS

JP        2000-82245        3/2000

* cited by examiner

Primary Examiner—Paul Thibodeau
Assistant Examiner—Kevin M. Bernatz
(74) Attorney, Agent, or Firm—Greer, Burns & Crain, Ltd.

(57) ABSTRACT

A magneto-optical recording medium includes at least a reflective layer and a recording layer formed in this order on a substrate, in which record and reproduction of information are carried out by irradiating the medium with laser beam from a recording layer side. The reflective layer includes two or more thin film layers different in surface roughness, of which one near the substrate has a surface tension smaller than a surface tension of one near the recording layer. The medium exhibits a coercive force and CNR of a recording layer of a magneto-optical recording medium to realize high density recording by contriving the constitution of the recording layer.

6 Claims, 8 Drawing Sheets

FIG. 4

| Element | Surface Tension at 30°C (mN/m) |
|---|---|
| W | 3471 |
| Mo | 3023 |
| Ta | 2887 |
| Fe | 2610 |
| Co | 2590 |
| Ni | 2319 |
| Cr | 2290 |
| Pt | 2096 |
| Ti | 2080 |
| Au | 1677 |
| Cu | 1422 |
| Al | 1135 |
| Ag | 1052 |
| Si | 1044 |
| Gd | 1015 |
| Tb | 868 |
| Nd | 778 |

FIG. 5

| | Coersive Force Hc | CNR (dB) | |
|---|---|---|---|
| | | Mark Length 0.2 μm | Mark Length 0.3 μm |
| Medium A | 13KOe | 45 | 47 |
| Medium B | 6KOe | 41 | 46.5 |

FIG. 6A

| Sample | First reflective layer Material (thickness) | γ1 (mN/m) | Ra(nm) | Second reflective layer Material (thickness) | γ2 (mN/m) | Ra (nm) | Period (nm) | Coersive force Hc(kOe) | CNR (dB) 0.2 μm |
|---|---|---|---|---|---|---|---|---|---|
| Conventional 1 | Ag 130nm | 1052 | 1.5 | None | --- | --- | 100 | 10 | 39 |
| Conventional 2 | Ag97Pd1Cu1Si1 130nm | 1052 | 0.35 | None | --- | --- | 96 | 5 | 41 |
| Conventional 3 | Al98Cr2 130nm | 1135 | 1.5 | None | --- | --- | 100 | 10 | 39 |
| 4 | Ag97Pd1Cu1Si1 100nm | 1052 | 0.3 | Ag89Pd1Cu10 30nm | 1237 | 0.6 | 84 | 11 | 43.5 |
| 5 | Ag97Pd1Cu1Si1 100nm | 1052 | 0.3 | Ni80P20 30nm | 2319 | 0.65 | 82 | 12.5 | 44.5 |
| 6 | Ag97Pd1Cu1Si1 100nm | 1052 | 0.3 | Ta 30nm | 2887 | 0.55 | 86 | 11 | 42.5 |
| 7 | Ag97Pd1Cu1Si1 100nm | 1052 | 0.3 | Fe80W20 30nm | 2610 | 0.6 | 80 | 13 | 45 |
| 8 | Ag97Pd1Cu1Si1 100nm | 1052 | 0.3 | Al98Cr2 30nm | 1135 | 0.7 | 82 | 12 | 43.5 |
| 9 | Ag97Pd1Cu1Si1 100nm | 1052 | 0.3 | Cu 30nm | 1422 | 0.55 | 86 | 12.5 | 44.2 |
| 10 | Ag97Pd1Cu1Si1 100nm | 1052 | 0.3 | Au 30nm | 1677 | 0.5 | 84 | 11 | 43.2 |

FIG. 6B

| Sample | First reflective layer | | | Second reflective layer | | | Period (nm) | Coersive force Hc(kOe) | CNR (dB) 0.2 μm |
|---|---|---|---|---|---|---|---|---|---|
| | Material (thickness) | γ1 (mN/m) | Ra (nm) | Material (thickness) | γ2 (mN/m) | Ra (nm) | | | |
| 11 | Ag97Pd1Cu1Si1 100nm | 1052 | 0.3 | Al99Pt1 30nm | 1135 | 0.5 | 86 | 11 | 44.2 |
| 12 | Ag97Pd1Cu1Si1 100nm | 1052 | 0.3 | Al98Gd1Co1 30nm | 1135 | 0.7 | 86 | 11.5 | 43.5 |
| 13 | Ag97Pd1Cu1Si1 100nm | 1052 | 0.3 | Al99Si1 30nm | 1135 | 0.65 | 86 | 12 | 44.3 |
| 14 | Ag97Pd1Cu1Si1 100nm | 1052 | 0.3 | Al99Tb1 30nm | 1135 | 0.65 | 84 | 11.5 | 44 |
| 15 | Ag97Pd1Cu1Si1 100nm | 1052 | 0.3 | Al99Nd1 30nm | 1135 | 0.7 | 84 | 11 | 43.5 |
| 16 | Ag97Pd1Cu1Si1 100nm | 1052 | 0.3 | Al99Pd1 30nm | 1135 | 0.7 | 84 | 11 | 43.5 |
| 17 | Al98Cr2 100nm | 1135 | 0.6 | Fe80W20 30nm | 2610 | 0.8 | 86 | 13 | 44.5 |
| 18 | Ni80P20 100nm | 1135 | 0.3 | Fe80W20 30nm | 2610 | 0.6 | 86 | 13 | 44.5 |
| 19 | Al97Ti2Si1 100nm | 1135 | 0.35 | Fe80W20 30nm | 2610 | 0.65 | 84 | 12.5 | 44.2 |

| Sample | Material of First Reflective Layer (thickness) | Material of Second Reflective Layer (thickness) | Material of Third Reflective Layer (thickness) | Material of Fourth Reflective Layer (thickness) | Ra of Last Layer (nm) | Coersive Force Hc (kOe) | CNR (dB) 0.2 μm |
|---|---|---|---|---|---|---|---|
| 8 | Ag97Pd1Cu1Si1 100nm | Al98Cr2 30nm | None | None | 0.7 | 12 | 42.5 |
| 20 | Ag97Pd1Cu1Si1 100nm | Al98Cr2 20nm | Pt 10nm | None | 0.65 | 13.2 | 44.5 |
| 21 | Ag97Pd1Cu1Si1 100nm | Al98Cr2 20nm | Pt 5nm | Fe 5nm | 0.55 | 13.2 | 45 |
| Surface Tension γ (mN/m) | 1052 | 1135 | 2096 | 2610 | | | |

…

MAGNETO-OPTICAL RECORDING MEDIUM WITH REFLECTIVE LAYER FORMED FROM TWO THIN FILMS POSSESSING DIFFERENT SURFACE TENSIONS

CROSS-REFERENCE TO RELATED APPLICATION

This application is related to Japanese Patent Application No. 2001-383178 filed in Dec. 17, 2001, whose priority is claimed under 35 USC §119, the disclosure of which is incorporated by reference in its entirety.

BACKGROUND OF THE INVENTION

1. Field of the Invention

The present invention relates to a magneto-optical recording medium, and more particularly, it relates to a magneto-optical recording medium, in which recordation and reproduction of information are carried out by incident of light from the opposite side to the substrate.

2. Description of the Related Art

Most conventional magneto-optical recording media are formed with a substrate of a thickness of about 1.0 mm having accumulated thereon a recording layer and a protective layer, and recording and reproduction of information are carried out by the incidence of light through the substrate.

As means for developing a high density magneto-optical recording medium, a spot size of a light beam irradiated on a magneto-optical recording medium has been decreased. In general, there is a relationship expressed by the equation $\phi=\lambda/2NA$, in which $\phi$ represents the spot size, NA represents a numerical aperture of an objective lens, and $\lambda$ represents a wavelength of the laser light. According to the equation, in order to decrease the spot size $\phi$, it is necessary to increase the numerical aperture NA of the objective lens. When NA is increased, the focal length is shortened while the resolution can be increased.

Therefore, when the numerical aperture NA becomes larger, the aberration is increased due to thickness unevenness and tilt of the substrate, and thus it is necessary to decrease the thickness of the substrate as far as possible. Accordingly, it is preferred that recordation and reproduction are carried out by incident of light from the side of the recording layer for realizing high density recording, rather than recordation and reproduction that are carried out by incident of light from the side of the substrate.

The model of recordation and reproduction carried out by incident of light from the side of the recording layer is hereinafter referred to as a front illumination model.

FIG. 9 is a schematic cross sectional view showing a conventional magneto-optical recording medium of the front illumination model.

The magneto-optical recording medium contains a substrate 1 formed, for example, with polycarbonate having accumulated thereon at least a reflective layer 2, a recording layer 4, a protective layer 5 and a coating layer 6. The reflective layer 2 is generally constituted, for example, with a metallic film, such as silver, and reflects a light beam 7 incident from above on the coating layer 6 to the side of the coating layer 6.

The reflective layer 2 is demanded to have, in addition to the function of reflecting light, a function of heat liberation for recording marks of refined shapes on the recording layer. Therefore, it is necessary in general that the reflective layer 2 has a thickness of about 100 nm or more.

The reflective layer 2 is formed on the substrate 1 by a DC sputtering method using a solid metal target, such as silver.

However, in the case where a reflective layer having a thickness of 100 nm or more is formed, uneven convexoconcaves of granular form of about 50 nm or more are formed on the surface of the reflective layer 2. For example, lands and grooves having a width of about 0.2 μm are formed in a convexoconcave form on the surface of the substrate 1. When the reflective layer 2 having uneven convexoconcaves of granular form is formed on the lands and the grooves, such a problem occurs mainly in that the lands are broadened to dull up the corners of the rectangular shape, whereby the predetermined land-groove width ratio cannot be observed.

Ra is used as a parameter for showing surface roughness of a substrate. While the surface roughness Ra of the substrate 1 itself is as small as about 0.3 nm, the surface roughness Ra is increased to more than 1.5 nm when the reflective layer 2 of about 100 nm is accumulated. When the surface roughness is increased by forming the reflective layer 2, media noise is increased, which adversely affects the magnetic characteristics of the recording layer 4 formed on the reflective layer 2, whereby high resolution cannot be realized.

In order to improve the surface roughness of the reflective layer 2, it is considered that the reflective layer 2 after forming is subjected to an etching treatment to be smoothened. Furthermore, it is also considered that an alloy having an additive doped thereto (such as Si doped Ag) is used as a material for forming the reflective layer 2 to improve the smoothness with the function of heat liberation being maintained.

When the smoothness of the reflective layer 2 is improved, the so-called media noise is decreased to improve CNR and SNR, but when the surface of the reflective layer 2 does not have an appropriate roughness, such a problem arises that the coercive force Hc of the recording layer 4 formed thereon is lowered.

The lowering of the coercive force Hc brings about deterioration of recordation and reproduction of information recorded by a temperature or a magnetic field, which are externally applied. Therefore, the smoothening of the reflective layer 2 is preferred for decreasing the media noise, but excessive smoothening is not preferred since the coercive force of the recording layer 4 is lowered.

The coercive force of the recording layer 4 is increased when it grows in such a manner that the directions of magnetization are aligned to one direction. For example, the directions of magnetization are liable to be aligned and are effective to increase the coercive force in the case where the surface of the reflective layer 2 as the underlayer has periodical convexoconcaves or grains of several tens nm, rather than in the case where substantially no convexoconcave is formed thereon.

However, when the period of the convexoconcaves formed on the surface of the reflective layer 2 is too large, short marks cannot be recorded, and as a result, high density recording cannot be carried out.

It is understood from the foregoing that the reflective layer 2 formed on the substrate necessarily has an appropriate thickness for maintaining the heat liberation function; necessarily has an appropriate surface roughness for aligning the directions of magnetization of the recording layer 4 to a certain direction to obtain a large coercive force; and preferably has a small period of the convexoconcaves formed on the surface for recording marks as short as possible to realize high density recording.

SUMMARY OF THE INVENTION

This invention provides a magneto-optical recording medium, in which plural reflective layers are provided, and the surface roughness and the surface tension of the respective reflective layers are appropriately selected, whereby the heat liberation characteristics of the reflective layers can be maintained, and the coercive force and the CNR can be improved.

The invention relates to, as one aspect, a magneto-optical recording medium comprising at least a reflective layer and a recording layer formed in this order on a substrate, wherein the medium is adapted to record and reproduce information by irradiation with light from a recording layer side, and the reflective layer comprises two or more thin film layers different in surface roughness, and of the thin film layers, one near the substrate has a surface tension smaller than a surface tension of one near the recording layer.

According to an aspect of the invention, the coercive force of the recording layer can be increased in comparison to the conventional products with the heat liberation characteristics of the reflective layer being maintained.

Furthermore, the CNR (carrier/noise ratio) can be improved, in addition to the reduction of the media noise, and thus the recording density can be increased.

It is possible that the thin film layers constituting the reflective layer are gradually adjusted in surface roughness in such a manner that the thin film layer nearest to the substrate has the smallest surface roughness, and the thin film layer nearest to the recording layer has the largest surface roughness. According to the embodiment, the coercive force of the recording layer can be further increased.

It is also possible that of the thin film layers constituting the reflective layer, the first thin film layer nearest to the substrate comprises Ag, Al or Ni as a main component and at least one element selected from Pd, Cu, Si, Ti, P and Cr added in prescribed amounts.

It is also possible that the other thin film layers than the first thin film layer comprise a material containing at least one element selected from W, Mo, Ta, Fe, Co, Ni, Cr, Pt, Ti, P, Au, Cu, Al, Ag, Si, Gd, Tb, Nd and Pd.

BRIEF DESCRIPTION OF THE DRAWINGS

FIG. 4 is a table showing numeral examples of surface tensions of elements;

FIG. 5 is a table showing comparison of coercive force and CNR of the two media;

FIGS. 6A and 6B are a table showing comparison of characteristics in examples where the materials of the first reflective layer and the second reflective layer of the invention are changed;

DESCRIPTION OF THE PREFERRED EMBODIMENTS

In one embodiment of the invention, the magneto-optical recording medium of the invention is constituted with a substrate having formed thereon at least a reflective layer and a recording layer in this order, and further formed on the recording layer, a protective layer and a coating layer in this order.

The substrate, the recording layer, the protective layer and the coating layer herein can be formed with the materials that have been conventionally used. For example, the substrate may be formed with glass or an acrylic resin, the recording layer may be formed with a magnetic film, such as TbFeCo, the protective layer may be formed with a non-magnetic layer, such as SiN, and the coating layer may be formed with a transparent ultraviolet ray-cured resin.

The reflective layer is generally required to have a high heat liberation function. The medium of the invention is intended to realize, by forming the reflective layer with two or more thin film layers, not only the maintenance of the heat liberation function, but also the improvement of the coercive force of the recording layer and the improvement of the CNR by reducing the media noise.

In particular, a first thin film layer nearest to the substrate is a layer formed to maintain the high heat liberation function, which is formed to have the smallest surface roughness for improvement of the CNR. The other reflective layer formed on the first thin film layer is formed to have a larger surface tension than the first thin film layer mainly for the improvements of the coercive force and the CNR of the recording layer.

When the thin film layer near the recording layer has a larger surface tension than the first thin film layer nearest the substrate, the thin film layer near the recording layer has convexoconcaves with a minute period as described later, and the surface roughness thereof becomes larger than that of the first thin film layer, whereby the coercive force and the CNR of the recording layer can be improved. The reflective layer having such natures can be formed with a material containing the elements described in the foregoing.

An embodiment of the invention will be described in detail below with reference to the drawings, but the invention is not construed as being limited thereto.

Constitution of Embodiment of Magneto-Optical Recording Medium of the Invention

An embodiment where a reflective layer is constituted with two thin film layers will be described.

Figure 1:
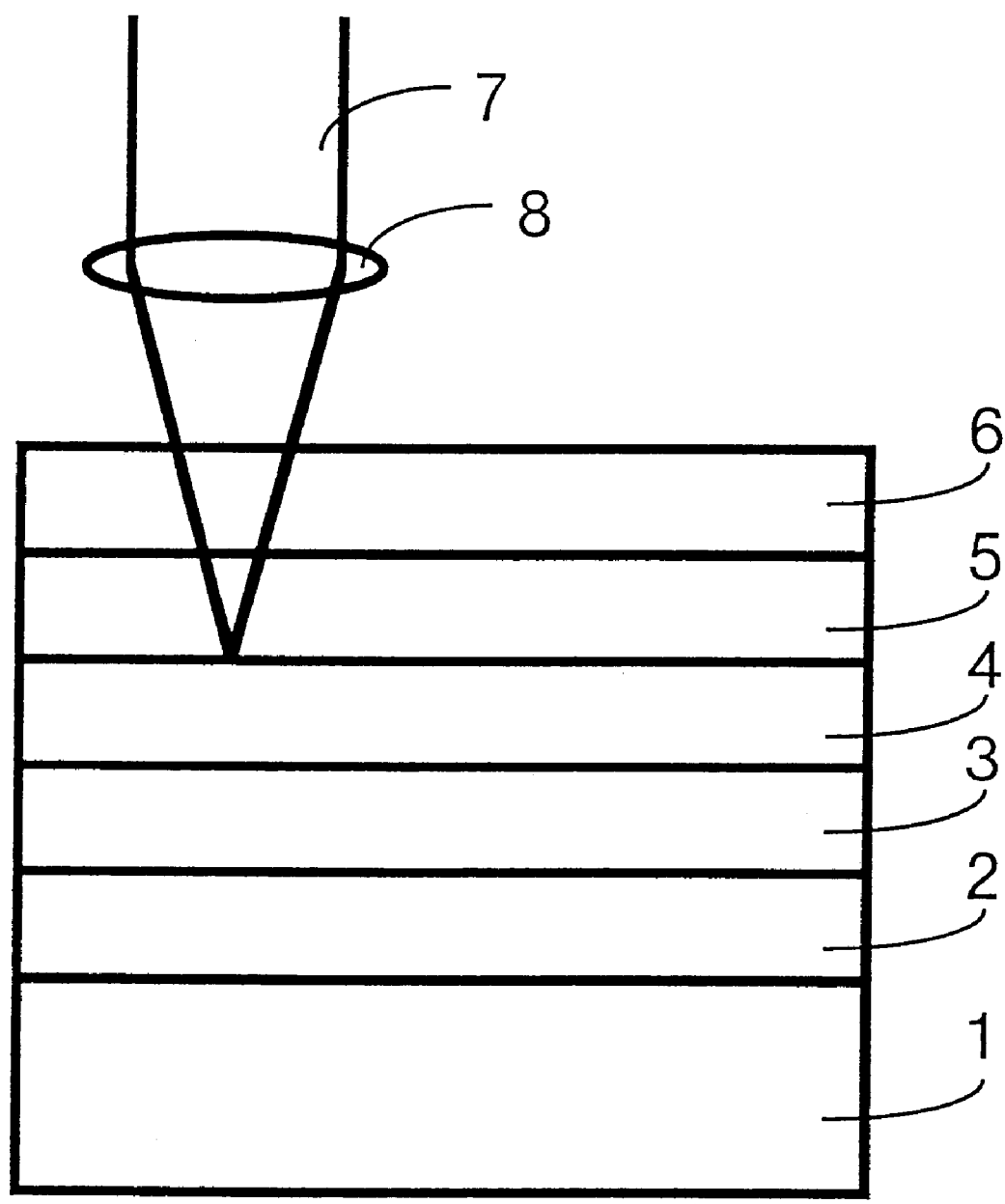
FIG. 1 is a cross sectional view showing an embodiment of a magneto-optical recording medium of the invention.

FIG. 1 is a cross sectional view of the embodiment of the magneto-optical recording medium of the invention.

The magneto-optical recording medium of the invention contains a substrate 1 having accumulated thereon a first reflective layer 2, a second reflective layer 3, a recording layer 4, a protective layer 5 and a coating layer 6 in this order. The respective constitutional components will be described below.

(1) Substrate 1

The substrate 1 is formed with glass or a resin and is a so-called land-groove substrate having lands and grooves formed on the surface that is in contact with the first reflective layer 2.

(2) First Reflective Layer 2

The first reflective layer 2 mainly exerts the heat liberation function and is formed to have a thickness of about 100 nm or more and a smooth surface having as few convexoconcaves as possible.

For example, the first reflective layer 2 may be formed with a material containing Ag, Al or Ni as a main component and at least one element selected from Pd, Cu, Si, Ti, P and Cr added in prescribed amounts.

Figure 2A:
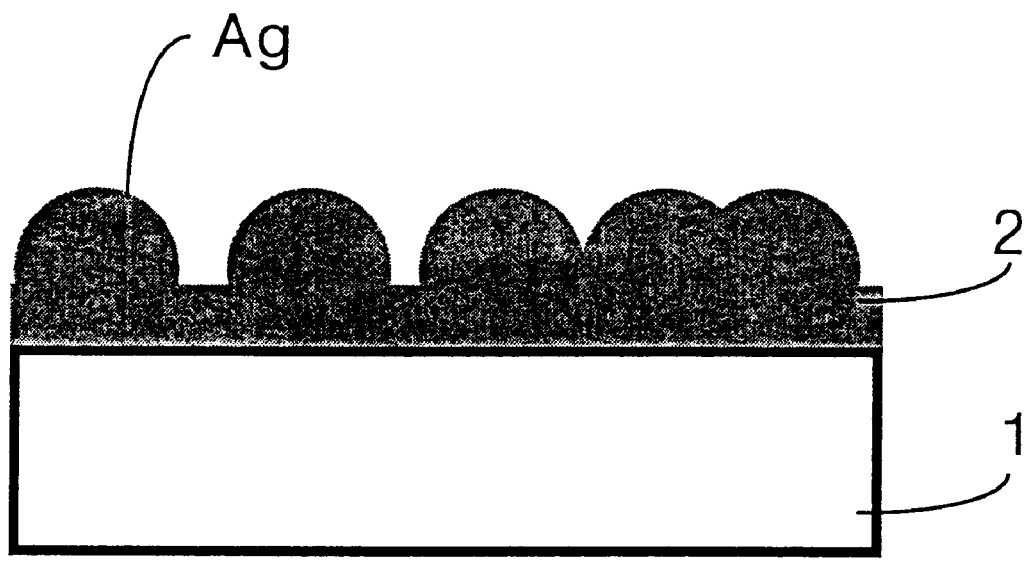
FIGS. 2A and 2B are schematic diagrams showing surface shapes of the first reflective layers.
Figure 2B:
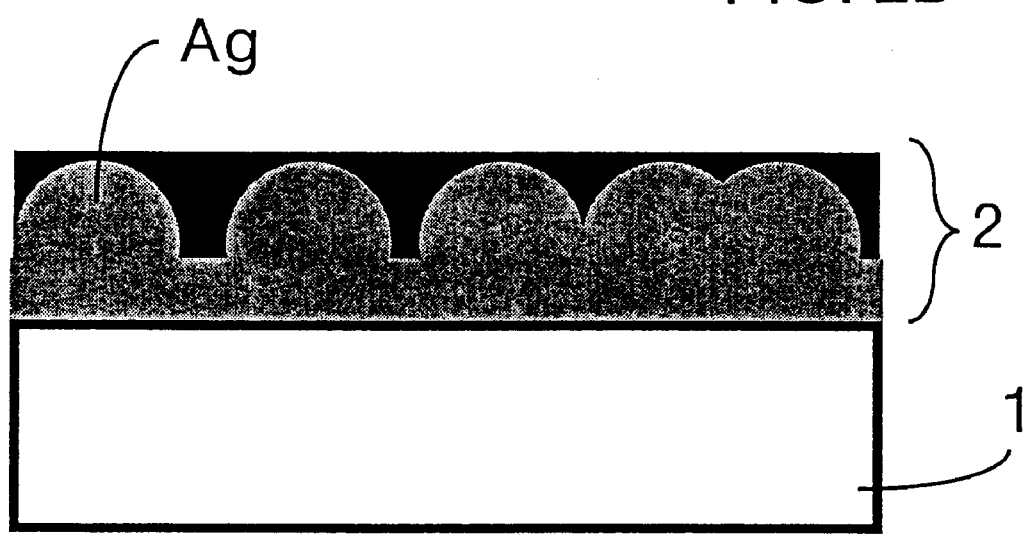

FIGS. 2A and 2B are schematic cross sectional views showing surface shapes of the first reflective layers 2. FIG. 2A shows the surface shape in the case where the layer is formed by a co-sputtering method only with Ag, and FIG. 2B shows the surface shape in the case where the layer is formed by a co-sputtering method with Ag as a main component and Cu, Pd and Si added.

In the case where the layer is formed only with Ag, convexoconcaves of a relatively large granular form (having a diameter of about 55 nm) are formed with Ag as shown in FIG. 2A. When the prescribed amounts of Cu, Pd and Si are added as described later, a smooth surface is formed by bridging gaps among the convexes as shown in FIG. 2B.

In FIG. 2A, the Ra, which is a parameter showing the surface roughness of the first reflective layer 2, is about 1.5 nm, whereas in FIG. 2B, the Ra is about 0.3 nm, and thus it is understood that the surface of the first reflective layer 2 shown in FIG. 2B is considerably smoother.

(3) Second Reflective Layer 3

The second reflective layer 3 is provided mainly for preventing reduction of the coercive force of the recording layer 4 and is formed to have a surface roughness that is larger than the first reflective layer 2. Furthermore, as described later, it is formed with a material having a surface tension that is larger than the first reflective layer 2 near the substrate 1.

For example, an alloy containing Fe and W is subjected to a sputtering method to form the second reflective layer 3 having minute convexoconcaves having a period of about 85 nm on the surface thereof. By forming the second reflective layer 3, the land-groove shape of the underlayer substrate can be reflected, and the coercive force Hc of the recording layer 4 formed on the second reflective layer 3 can be increased.

(3-a) Surface Roughness and Magnetic Characteristics of Reflective Layer

The relationship between the surface roughness of the second reflective layer 3 and the magnetic characteristics will be described.

In general, the relationship between the minimum domain that can be retained by the recording layer 4 (i.e., the length of the shortest mark) and the magnetic characteristics can be expressed by the following equation.

$$d = \sigma/(2 M_s H_c)$$

wherein d represents the domain, σ represents a constant determined by the material and the composition of the recording layer and the film forming conditions, Ms represents the saturation magnetization, and Hc represents the coercive force.

According to the equation, when the coercive force Hc is small, the domain d becomes large, which means that high density recording cannot be achieved. In other words, in order to achieve high density recording, the domain d should be small, and thus it is necessary that the coercive force Hc is made large.

In the case of the surface having convexoconcaves of a large period formed thereon as shown in FIG. 2A, it is difficult to form small domains d that are aligned in the direction of perpendicular magnetization in the recording layer due to the large surface roughness, and thus the media noise is increased. Consequently, in the case where the surface roughness is large, small domains d cannot be well formed to deteriorate the CNR.

On the other hand, in the case of the too smooth surface as shown in FIG. 2B, the domain d becomes large according to the equation above since the coercive force Hc of the recording layer 4 is decreased, and thus high density recording cannot be achieved.

Accordingly, in order to obtain a high coercive force Hc and to achieve high density recording by the small domains d, it is necessary that the underlayer of the recording layer 4 has an appropriate surface roughness, and it is preferred to form the second reflective layer 3 having a surface roughness larger than the first reflective layer 2 and having convexoconcaves of a minute period.

In order to form the convexoconcaves of a minute period on the surface of the second reflective layer 3, materials may be selected by taking the surface tensions of the two reflective layers 2 and 3 into consideration. In general, when a material having a larger surface tension is contained, convexoconcaves of a minute period can be formed on the surface.

(3-b) Surface Tension and Surface Shape of Reflective Layer

Figure 3A:
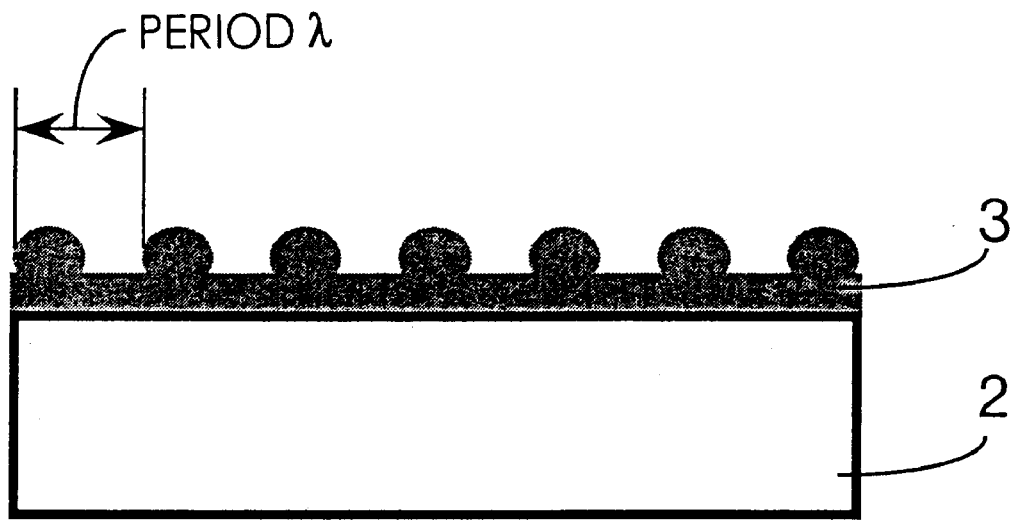
FIGS. 3A and 3B are schematic diagram showing the relationship between the surface tension and the surface shape.
Figure 3B:
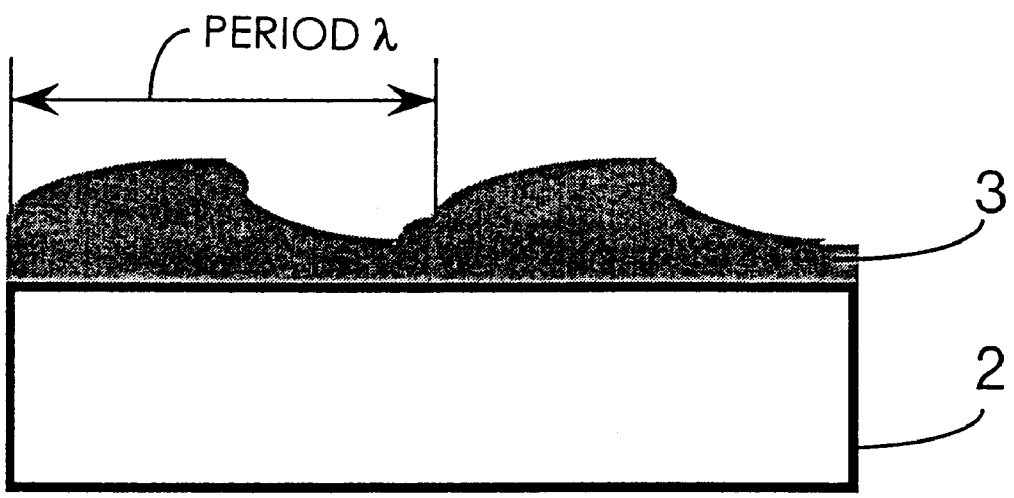

FIGS. 3A and 3B are schematic diagrams showing the relationship between the surface tension and the surface shape of the reflective film.

FIG. 3A is a schematic diagram showing the state of the surface in the case where the surface tension (γ1) of the element constituting the first reflective layer 2 is smaller than the surface tension (γ2) of the element constituting the second reflective layer 3. For example, when the second reflective layer 3 containing Fe, which has a larger surface tension than Ag, as a main component is formed on the first reflective layer 2 containing Ag as a main component, it is considered that the Fe element is formed as minute convexoconcaves of a small period λ as shown in FIG. 3A.

FIG. 3B is, on the other hand, a schematic diagram showing the state of the surface in the case where the surface tension (γ1) of the element constituting the first reflective layer 2 is larger than the surface tension (γ2) of the element constituting the second reflective layer 3. In this case, it is considered that the second reflective layer 3 is formed to have large convexoconcaves with a relatively large period (100 nm or more).

Therefore, in order to form convexoconcaves having a minute period on the surface of the second reflective layer 3, it is preferred that the second reflective layer 3 is formed by using a material having a surface tension that is larger than that of the first reflective layer 2.

FIG. 4 is a table showing numeral examples of surface tensions (mN/m) of elements. Surface tensions at 30° C. are shown herein taking the melting points of the elements into consideration. For example, Ag has a melting point to of 961° C., a surface tension γ₀ near the melting point of 903 (mN/m) and a variation a (dr/dt) of −0.16, and the surface tension γ₃₀ at 30° C. can be obtained by the following equation.

$$\gamma_{30} \text{ of Ag} = \gamma_0 + (30 - t_0) \times a$$
$$= 903 + (30 - 961) \times (-0.16)$$
$$= 1,052 \text{ (mN/m)}.$$

The values for the other elements can also be obtained by the similar equation.

According to FIG. 4, the elements including Fe shown in the upper half of the table (i.e., W, Mo, Ta, Fe, Co, Ni, Cr, Pt and Ti) have a relatively large surface tension and can be used as a material for forming the second reflective layer 3, and an alloy obtained by combining plural elements selected therefrom can also be used. Examples thereof include FeW.

On the other hand, the elements of Au and below (i.e., Cu, Al, Ag, Si, Gd, Tb and Nd) have a relatively small surface tension and are not solely used as the second reflective layer, but it is considered that they are preferably used as an alloy with an element having a relatively large surface tension. Examples thereof include AlCr and AlPt.

A semiconductor obtained by combining plural elements may also be used. Examples thereof include SiP.

While FIGS. 3A and 3B show the surface shape for the example having the reflective layer containing two layers, the reflective layer may have a multi-layer structure containing three or more thin films. In the case of the multi-layer structure of n layers (n≧3), from the standpoint of improvement of the coercive force, the surface roughness of the first reflective layer nearest the substrate is the smallest, and the surface roughness of the thin film layer farthest from the substrate and in contact with the recording layer (referred to as a n-th reflective layer) is larger than the other thin film layers.

It is considered that the surface roughness of the intermediate reflective layers (from second to (n−1)th layers) between the first reflective layer and the n-th reflective layer preferably has such a configuration that the surface roughness is gradually increased going away from the substrate in order to maintain the good coercive force of the recording layer.

Furthermore, in the multi-layer reflective layer having n layers, such a configuration is used that the surface tension of the first reflective layer nearest the substrate is the smallest, whereas the surface tension of the n-th reflective layer farthest from the substrate and in contact with the recording layer is the largest, and the surface tensions of the intermediate reflective layers therebetween are gradually increased going away from the substrate.

By forming the reflective layer as thin films of the multi-layer structure having different surface tensions, high density recording, as well as improvement of the coercive force Hc of the recording layer can be attained.

(4) Recording Layer 4, Protective Layer 5 and Coating Layer 6

In the embodiment of FIG. 1, the recording layer 4 is formed as a magnetic film having a so-called perpendicular magnetic anisotropy. For example, TbFeCo and DyFeCo are used.

The protective layer 5 is to prevent oxidation and nitriding of the recording layer 4 and is formed as a non-magnetic layer capable of transmitting light. For example, SiN is used. The coating layer 6 is to prevent dusts and flaws and is formed with an ultraviolet ray-cured resin to a thickness of about 15 μm.

Thickness and Materials of Example of Magneto-optical Recording Medium of the Invention In the medium having such a constitution, because the first and second reflective layers 2 and 3 are formed with materials containing metals that do not transmit light as main components, a light beam 7 for recordation and reproduction is incident from the side of the coating layer 6 through a lens 8 as shown in FIG. 1.

An example of the magneto-optical recording medium of the invention shown in FIG. 1 can be produced by using the following materials and thickness.

Substrate 1:
Land-groove substrate formed with glass 2P having a diameter of 120 mm, a plate thickness of 1.2 mm, a land-groove width of 0.25 μ/m, and a groove depth of 30 nm First Reflective Layer 2:
Ag97Pd1Cu1Si1 alloy film having a thickness of 100 nm Second Reflective Layer 3:
Fe80W20 alloy film having a thickness of 30 nm Recording Layer 4:
TbFeCo magnetic film having a thickness of 25 nm Protective Layer 5:
SiN non-magnetic film having a thickness of 40 nm Coating Layer 6:
Transparent ultraviolet ray-cured resin having a thickness of 15 μm Production Process of Magneto-Optical Recording Medium of the Invention A production process of an example of the magneto-optical recording medium of the invention will be described.

A first reflective film 2 is formed on a substrate 1 by a co-sputtering method. An AgPdCu alloy target containing Ag as a main component and Pd and Cu added thereto and an Si target are used, and sputtering is carried out with a gas pressure of 0.5 Pa, electric power applied to the AgPdCu alloy target of 500 W and electric power applied to the Si target of 320 W.

According to the procedures, a first reflective layer 2 having a compositional ratio of Ag97Pd1Cu1Si1 is formed to a thickness of about 100 nm.

The surface of the first reflective layer 2 has a roughness Ra of about 0.3 nm, and the surface tension γ1 thereof is 1,052 (mN/m). Thus, a considerably smooth surface as shown in FIG. 2B is formed.

A second reflective layer 3 is then formed on the resulting structure by a sputtering method.

An alloy target of Fe and W is used, and sputtering is carried out with a gas pressure of 0.5 Pa and applied electric power of 500 W. According to the procedures, a second reflective layer 3 having a compositional ratio of Fe80W20 is formed to a thickness of about 30 nm.

The surface of the second reflective layer 3 has a roughness Ra of about 0.6 nm, and the surface tension γ2 thereof is 2,610 (mN/m). The surface roughness of the second reflective layer 3 is larger than that of the first reflective layer 2, and the surface tension γ2 thereof is larger than that of the first reflective layer 2.

The period of convexoconcaves formed on the surface as shown in FIG. 3A is measured with an AFM (atomic force microscope), and it is about 80 nm. In the conventional case where the reflective layer is formed only with Ag as shown in FIG. 2A, the period of convexoconcaves is about 100 nm, and therefore, it can be considered that convexoconcaves having a further minute size can be formed.

A recording layer 4 is then formed on the second reflective layer 3 by a sputtering method.

For example, an alloy target of TbFeCo is used, and the layer is formed by a sputtering method with a gas pressure of 0.5 Pa and applied electric power of 500 W. According to the procedures, a recording layer 4 having a sufficiently high coercive force Hc (13 kOe) and a good CNR (45 dB) can be obtained as described later.

A protective layer 5 is the formed on the recording layer 4 by a sputtering method. For example, a B-doped Si target is used, and sputtering film formation is carried out with a gas pressure of 0.3 Pa and applied electric power of 800 W.

Finally, a coating layer 6 is formed by a spin coating method.

An ultraviolet ray-curable resin is coated to a thickness of about 15 μm, which is then irradiated with an ultraviolet ray for about 30 seconds.

Through the foregoing process steps, a magneto-optical recording medium of the invention shown in FIG. 1 (hereinafter referred to as medium A) is formed.

Figure 9:
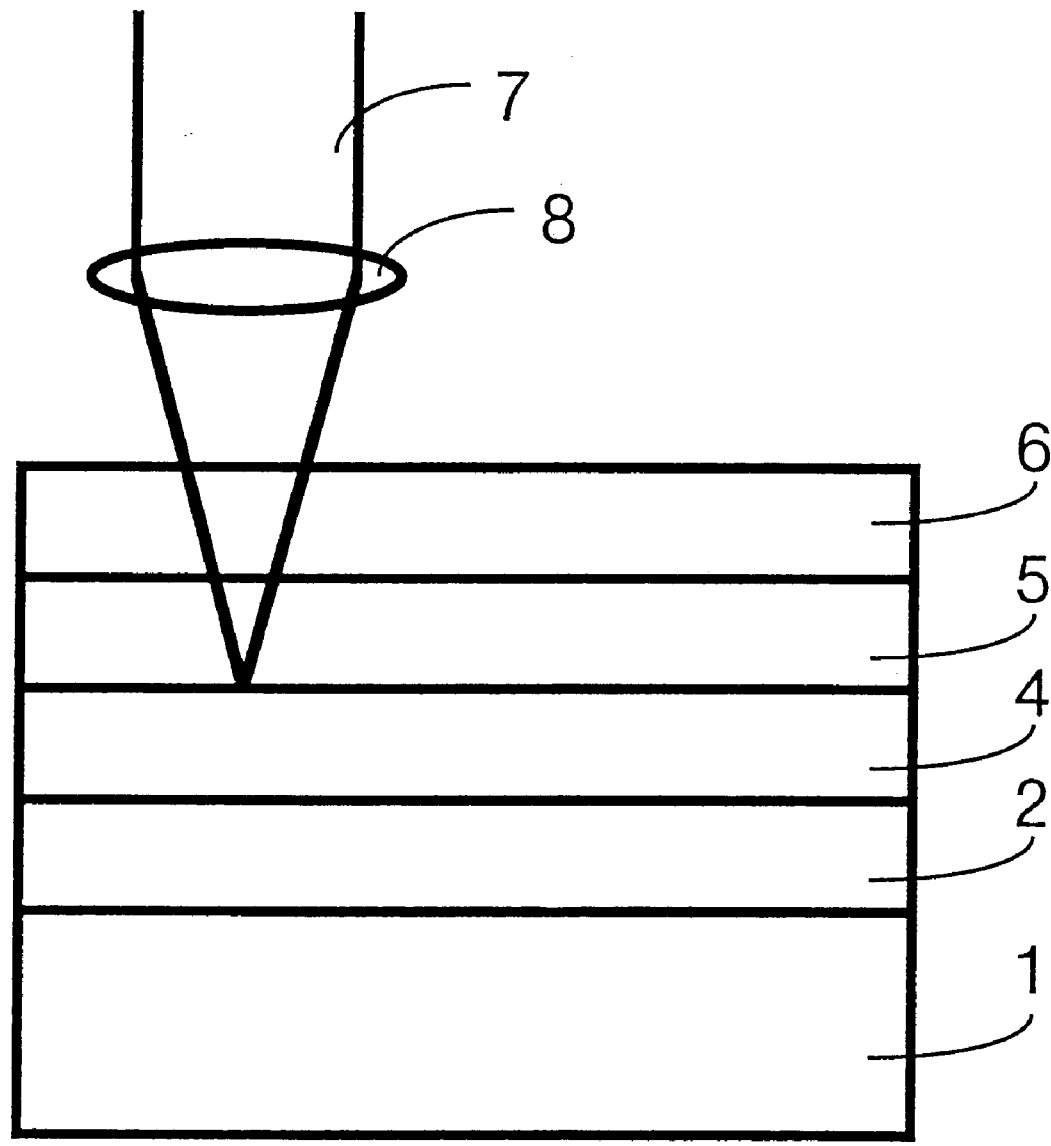
FIG. 9 is a schematic cross sectional view showing a conventional magneto-optical recording medium of the front illumination model.

Comparison in Magnetic Characteristics between the Invention and Conventional Product For comparison of characteristics, such as a coercive force, a conventional magneto-optical recording medium having no second reflective layer 3 as shown in FIG. 9 (hereinafter referred to as medium B) was produced.

The medium B is produced by forming a first reflective layer 2 formed with an Ag+Pd+Cu+Si alloy having a thickness of 130 nm on the same substrate as in the medium A, and further forming the recording layer 4, the protective layer 5 and the coating layer 6, which are the same as those in the medium A. The thickness of the reflective layer of the medium B is the same as the total thickness of the two reflective layers of the medium A.

FIG. 5 is a table showing comparison of the coercive force and the CNR of the media A of the invention and the conventional media B.

The coercive force and the CNR of the media are measured by using a Kerr effect measuring apparatus and a spectrum analyzer at a rotation speed of the medium of 9.0 m/s, a recorded mark length of 0.2 $\mu$m or 0.3 $\mu$m, recording power of 5.4 mW and reproducing power of 1.4 mW.

According to FIG. 5, the conventional medium B has a coercive force Hc of 6 kOe, and the medium A has a coercive force Hc of 13 kOe, which is twice or more that of the medium B.

In the case of a recorded mark of the smaller length of 0.2 $\mu$m, the medium B exhibits a CNR of 42 dB, whereas the medium A exhibits a CNR of 45 dB, and thus it is understood that the CNR is improved.

It is understood from the foregoing that because the reflective layer is formed with two layers having surface tensions and surface roughness different from each other, the medium A of the invention can be improved in coercive force and CNR in comparison to the conventional product even when small recording marks are recorded to achieve high density recording.

Particularly, in the case where the reflective layer is formed with two thin film layers, the following constitutions are preferred.

(1) The surface roughness of the first reflective layer 2 near the substrate is smaller than the surface roughness of the second reflective layer 3 far from the substrate.

(2) The surface tension of the first reflective layer 2 near the substrate is smaller than the surface tension of the second reflective layer 3 far from the substrate.

It is necessary that materials are selected to form a period of convexoconcaves formed on the surface of the second reflective layer as small as possible, and it can be attained by selecting the materials to satisfy the condition (2) with consideration of the surface tensions of the elements shown in FIG. 4. That is, when an element having a large surface tension is attached on a surface, a period of convexoconcaves formed on the surface becomes small.

Another Example of Magneto-Optical Recording Medium of the Invention

FIGS. 6A and 6B are a table showing comparison of characteristics of examples where the materials of the first reflective layer 2 and the second reflective layer 3 of the invention are changed.

In FIGS. 6A and 6B, a medium having a reflective layer having a single layer structure formed with a material having been conventionally used is also mentioned for comparison. The conventional products having a reflective layer formed only with Ag or AlCr have a surface roughness Ra of 1.5 nm, a period of convexoconcaves on the surface of about 100 nm, a coercive force Hc of 10 kOe and a CNR of 39 dB.

It can be understood that the conventional products have coercive forces and CNR that are considerably poor in comparison to the medium A.

In the conventional product having a reflective layer formed only with Ag97Pd1Cu1Si1, the surface is smoothened to have a surface roughness Ra of 0.35 nm so that the CNR is somewhat improved (41 dB), and the period is as small as 96 nm. However, the coercive force Hc is considerably low (5 kOe) due to the too-smooth surface, and it has a low mark maintenance power with respect to the external magnetic field.

On the other hand, the media having two reflective layers shown in FIGS. 6A and 6B have a large coercive force Hc of about from 11 to 13 kOe and an improved CNR of from 41 to 45 dB in comparison to the conventional products.

It is considered that this is because the second reflective layer 3 has an appropriate surface roughness Ra of from 0.5 to 0.7 nm, and the period of convexoconcaves formed on the surface thereof is as small as from 80 to 86 nm. Furthermore, as shown in FIG. 8, the surface tension $\gamma 1$ of the first reflective layer 2 is smaller than the surface tension of the second reflective layer 3.

It is understood from the foregoing that it is preferred that at least the surface roughness Ra of the second reflective layer is smaller than 1.5 nm, and more preferably about from 0.5 to 0.7 nm, and from the standpoint of CNR, it is preferred that at least the period of convexoconcaves on the surface is smaller than 100 nm, and more preferably 90 nm or less.

Figures 7, 8:
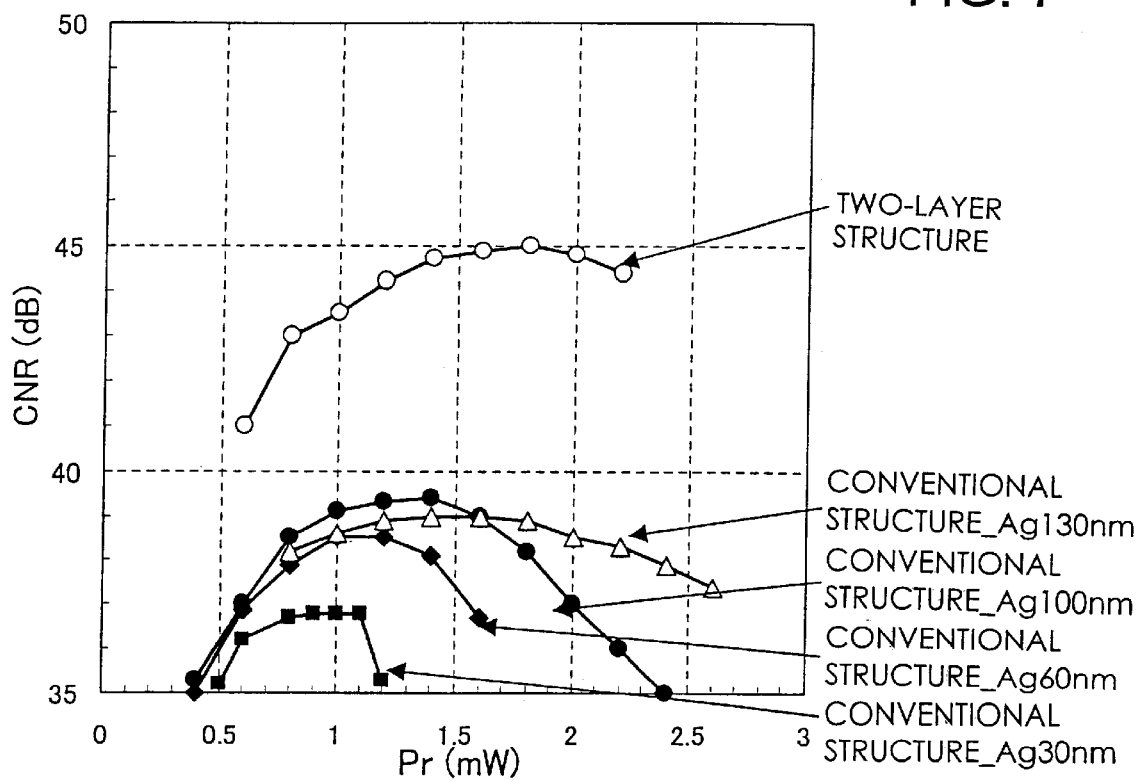
FIG. 7 is a graph showing the dependency of the CNR on the thickness of the underlayer of the medium of the invention and the conventional media.
FIG. 8 is a table showing comparison between the coercive force and the CNR in the medium having the multilayer reflective layer of the invention.

FIG. 7 is a graph showing the dependency of the CNR on the thickness of the underlayer of the medium of the invention and the conventional media.

The ordinate indicates the CNR (dB), and the abscissa indicates the reproduction power Pr (mW). The conventional medium is formed by accumulating, on a substrate, a single-layer reflective layer of Ag, a recording layer of TbFeCo (thickness: 25 nm) and a protective layer of SiN (thickness: 40 nm). In order to observe change of the CNR with respect to change of the thickness of the Ag reflective layer, the thickness of the Ag reflective layer is 30, 60, 100 or 130 nm.

The medium according to the invention is formed by accumulating, on a substrate, a reflective layer having a two-layer structure (first reflective layer: Ag97Pd1Cu1Si1 (thickness: 100 nm), second reflective layer: Fe80W20 (thickness: 30 nm)), a recording layer of TbFeCo (thickness: 25 nm) and a protective layer of SiN (thickness: 40 nm).

It is understood from FIG. 7 that the medium of the invention having a total thickness of the reflective layers of 130 nm is far improved in CNR as compared with the conventional medium having the single reflective layer having a thickness of 130 nm.

In the case of the conventional medium having the single reflective layer, a higher CNR is obtained by the thickness of the reflective layer of 100 nm in comparison to the thickness of 130 nm in a range of the reproduction power Pr of from 0.8 to 1.5 mW. It is considered that this is because when the thickness of the reflective layer is as large as 130 nm, the surface roughness of the reflective layer is increased, and the noise is rapidly increased.

In all the media in FIG. 7, when the reproduction power is further increased, the CNR is decreased at a certain value of the reproduction power. It is considered that this is because the heat liberation function becomes insufficient due to the increasing reproduction power, whereby the recording marks start to disappear.

Example of Reflective Layer Having Three or More Layers

While the media containing the reflective layer having the two-layer structure are shown in the foregoing examples, a medium containing a reflective layer having a structure of three or more layers. In the case of three or more layers, the coercive force and the CNR can be improved as similar to the case of the reflective layer having the two-layer structure by appropriately setting the surface roughness and the surface tension of the layers.

FIG. 8 is a table showing values of the coercive force and the CNR of the media containing a reflective layer having a multi-layer structure. The sample 20 in FIG. 8 uses a first reflective layer of Ag97Pd1Cu1Si1 (thickness: 100 nm), a second reflective layer of Al98Cr2 (thickness: 20 nm) and a third reflective layer of Pt (thickness: 10 nm) to make the thickness of the total reflective layer of 130 nm. In the sample 21 shown in FIG. 8, the thickness of the third reflective layer of Pt is changed to 5 nm, and a fourth reflective layer of Fe is formed to a thickness of 5 nm.

The surface tension of the first reflective layer is 1,052 mN/m, the surface tension of the second reflective layer is 1,135 mN/m, the surface tension of the third reflective layer is 2,096 mN/m, and the surface tension of the fourth reflective layer is 2,610 mN/m. The surface tension is smallest in the reflective layer nearest the substrate and is gradually increased by getting away from the substrate.

The surface roughness Ra is 0.3 nm for the first reflective layer, which is the smallest, and is gradually increased by getting away from the substrate. The surface roughness Ra of the third reflective layer (Pt) of the sample 20 is 0.65 nm, and the surface roughness Ra of the fourth reflective layer of the sample 21 is 0.55 nm.

According to FIG. 8, both the media having reflective layers of the three-layer structure and the four-layer structure are improved in coercive force Hc and CNR in comparison to the case of the reflective layer having the two-layer structure.

In the case where a glass 2P substrate is used as the substrate, while the surface roughness Ra thereof is conventionally about 0.3 nm, the surface roughness Ra of the substrate can be improved to about 0.20 nm by irradiating the substrate with DUV (deep UV).

When the first reflective layer of AgPdCu of a thickness of about 100 nm is formed on the substrate having a surface roughness Ra of about 0.20 nm, the surface has a surface roughness Ra of about 0.28 nm. It is preferred that the first reflective layer is formed to maintain the sufficient heat liberation function and to prevent generation of noise as far as possible. In order to prevent generation noise as far as possible, the surface is preferably smooth, and therefore, it is effective that the first reflective layer is formed after the irradiation of the substrate with DUV.

According to the invention, the reflective layer formed on the substrate is formed with materials having surface roughness and surface tensions that are different from each other, whereby the coercive force of the recording layer is increased, and the CNR thereof is improved while the good heat liberation function, which is the primary role of the reflective layer, is maintained.

Therefore, the demanded recordation and reproduction characteristics with respect to coercive force and CNR are satisfied even when the recording marks are small, whereby a magneto-optical recording medium of higher density than the conventional products can be realized.

What is claimed is:

1. A magneto-optical recording medium comprising at least a reflective layer and a recording layer formed in this order on a substrate, wherein the medium is adapted to record and reproduce information by laser beam irradiated from a recording layer side, and the reflective layer comprises two or more thin film layers different in surface roughness, and of the thin film layers, one near the substrate has a surface tension smaller than a surface tension of one near the recording layer.

2. A magneto-optical recording medium as claimed in claim 1, wherein the thin film layers constituting the reflective layer are gradually adjusted in surface roughness in such a manner that of the thin film layers, a first thin film that is the nearest to the substrate has the smallest surface roughness and a thin film layer that is the nearest to the recording layer has the largest surface roughness.

3. A magneto-optical recording medium as claimed in claim 2, wherein the first thin film layer is formed of a material containing Ag, Al or Ni as a main component and by doping a prescribed amount of at least one element selected from Pd, Cu, Si, Ti, P and Cr.

4. A magneto-optical recording medium as claimed in claim 3, wherein the thin film layers constituting the reflective layer other than the first thin film layer are formed of materials containing at least one element selected from W, Mo, Ta, Fe, Co, Ni, Cr, Pt, Ti, P, Au, Cu, Al, Ag, Si, Gd, Th, Nd and Pd.

5. A magneto-optical recording medium as claimed in claim 2, wherein the thin film layer nearest to the recording layer has a surface roughness Ra smaller than 1.5 nm and a period of convexoconcaves formed on a surface of the layer nearest to the recording layer is smaller than 100 nm.

6. The magneto-optical recording medium of claim 1, wherein the two or more thin film layers have a different main component, and of the thin film layers, said main component of said layer near the substrate has a surface tension as measured at 30° C. smaller than a surface tension of said main component of said layer near the recording layer as measured at 30° C.

* * * * *

UNITED STATES PATENT AND TRADEMARK OFFICE
CERTIFICATE OF CORRECTION

PATENT NO. : 6,727,007 B2 Page 1 of 1
DATED : April 27, 2004
INVENTOR(S) : Kamimura et al.

It is certified that error appears in the above-identified patent and that said Letters Patent is hereby corrected as shown below:

Column 12,
Line 36, please delete "Th" and insert -- Tb -- therefor.

Signed and Sealed this

Fourth Day of January, 2005

JON W. DUDAS
*Director of the United States Patent and Trademark Office*